US012614883B2

(12) United States Patent
Shimoyama

(10) Patent No.: US 12,614,883 B2
(45) Date of Patent: Apr. 28, 2026

(54) CONNECTOR

(71) Applicant: Yamaichi Electronics Co., Ltd., Tokyo (JP)

(72) Inventor: Takahiro Shimoyama, Tokyo (JP)

(73) Assignee: YAMAICHI ELECTRONICS CO., LTD., Tokyo (JP)

( * ) Notice: Subject to any disclaimer, the term of this patent is extended or adjusted under 35 U.S.C. 154(b) by 305 days.

(21) Appl. No.: 18/117,133

(22) Filed: Mar. 3, 2023

(65) Prior Publication Data

US 2023/0283024 A1     Sep. 7, 2023

(30) Foreign Application Priority Data

Mar. 7, 2022     (JP) ................................. 2022-034451

(51) Int. Cl.
| *H01R 24/54* | (2011.01) |
| *H01R 24/52* | (2011.01) |
| *H04N 23/51* | (2023.01) |

(52) U.S. Cl.
CPC ........... *H01R 24/542* (2013.01); *H01R 24/52* (2013.01); *H01R 24/545* (2013.01); *H04N 23/51* (2023.01)

(58) Field of Classification Search
None
See application file for complete search history.

(56) References Cited

U.S. PATENT DOCUMENTS

| 5,088,937 | A |   | 2/1992 | Gabany |
| 5,494,454 | A | * | 2/1996 | Johnsen ................. H01R 9/053 |
|   |   |   |   | 439/578 |

| 5,641,294 | A |   | 6/1997 | Beard |
| 6,808,395 | B2 |   | 10/2004 | Lin et al. |
| 7,018,216 | B1 | * | 3/2006 | Clark ................. H01R 13/6592 |
|   |   |   |   | 439/63 |
| 7,165,974 | B2 | * | 1/2007 | Kooiman ............... H01R 24/52 |
|   |   |   |   | 439/63 |
| 7,326,063 | B1 | * | 2/2008 | Raudenbush ........ H01R 13/748 |
|   |   |   |   | 439/63 |
| 7,510,434 | B2 | * | 3/2009 | Hantsch ................. H01R 24/42 |
|   |   |   |   | 439/578 |

(Continued)

FOREIGN PATENT DOCUMENTS

| EP | 0867978 A2 | 9/1998 |
| EP | 2367239 A1 | 9/2011 |

(Continued)

OTHER PUBLICATIONS

Extended European Search Report dated Jul. 17, 2023 issued Application No. 231597915.5.

*Primary Examiner* — Ross N Gushi
(74) *Attorney, Agent, or Firm* — Panitch Schwarze Belisario & Nadel LLP

(57)     ABSTRACT

Provided is a connector that can achieve improvement in strength, improvement in shape accuracy, a reduction in the number of components, and a reduction in the number of steps required for assembly. A connector for connecting an external substrate and an external cable to each other includes: a metal casing having a ground terminal part electrically connected to and fitted into an external substrate-side connector mounted to the substrate and a fitting part into which the cable is fitted, and the ground terminal part and the fitting part are integrally formed.

5 Claims, 14 Drawing Sheets

(56)                    References Cited

U.S. PATENT DOCUMENTS

| | | | | |
|---|---|---|---|---|
| 10,459,188 | B2 * | 10/2019 | Sakamoto | ............. G03B 17/08 |
| 11,158,984 | B2 * | 10/2021 | Graßl | ................... H01R 13/111 |
| 2013/0029520 | A1 | 1/2013 | Lee et al. | |
| 2015/0222795 | A1 | 8/2015 | Sauer et al. | |

FOREIGN PATENT DOCUMENTS

| | | | |
|---|---|---|---|
| JP | 2017-041347 | A | 2/2017 |
| JP | 2019-040833 | A | 3/2019 |
| JP | 2019-133748 | A | 8/2019 |
| JP | 2022-011703 | A | 1/2022 |

* cited by examiner

FIG. 14

CONNECTOR

CROSS-REFERENCE TO RELATED APPLICATION

This application claims priority under 35 U.S.C. § 119(b) to Japanese Application No. 2022-034451, filed Mar. 7, 2022, the disclosure of which is incorporated herein by reference.

BACKGROUND

1. Technical Field

The present invention relates to a connector.

2. Description of Related Art

There are camera modules such as on-vehicle camera modules, for example, in which a substrate on which an imaging device such as a CCD sensor or a CMOS sensor is mounted and an optical device such as a lens are integrated, and a connector is used for connecting a cable such as a coaxial cable to such a camera module (for example, Japanese Patent Application Laid-Open No. 2019-133748).

Japanese Patent Application Laid-Open No. 2019-133748 is an example of the related art.

The connector disclosed in Japanese Patent Application Laid-Open No. 2019-133748 includes an outer conductor fitted into the connector provided to a substrate and is structured such that the outer conductor is joined to an outer conductor holding part by welding.

When the outer conductor and the outer conductor holding part are joined with each other by welding, however, there are concerns about insufficient strength, variation in positional accuracy of the outer conductor relative to the outer conductor holding part, an increase in the number of components, an increase in the man-hours required for assembly, and the like.

BRIEF SUMMARY

Accordingly, the present invention intends to provide a connector that can achieve improvement in strength, improvement in shape accuracy, a reduction in the number of components, and a reduction in the number of steps required for assembly.

To solve the above problem, the connector of the present invention employs the following solutions.

That is, a connector according to one aspect of the present invention is a connector for connecting an external substrate and an external cable to each other, and the connector includes: a metal casing having a ground terminal part and a fitting part, the ground terminal part being electrically connected to and fitted into an external substrate-side connector mounted to the substrate, and the fitting part into which the cable is fitted, and the ground terminal part and the fitting part are integrally formed.

According to the connector of the present aspect, since the connector includes the metal casing having the ground terminal part and the fitting part, the ground terminal part is electrically connected to and fitted into the substrate-side connector mounted to the substrate, and the fitting part into which the cable is fitted, and the ground terminal part and the fitting part are integrally formed, the strength as a connector can be improved compared to a case where the ground terminal part is joined (for example, welded) with the casing having the fitting part. Accordingly, when the ground terminal part of the connector is connected to (fitted into) the substrate-side connector, the possibility of damage to the connector being can be reduced.

Further, since the ground terminal part and the fitting part are integrally formed, no gap is formed between the ground terminal part and the fitting part and the ground is enhanced compared to a case where the ground terminal part is joined to the casing having the fitting part, and therefore, electrical performance is improved (signal transmission is stabilized). Further, the accuracy of the shape of the casing (such as the positional accuracy of the ground terminal part relative to the fitting part) is more reliably determined. Further, a reduction in the number of components or a reduction in the number of steps required for assembly can be achieved.

Further, in the connector according to one aspect of the present invention, the casing has a case part that accommodates the substrate, and the ground terminal part, the fitting part, and the case part are integrally formed.

According to the connector of the present aspect, since the casing has a case part that accommodates the substrate, and the ground terminal part, the fitting part, and the case part are integrally formed, accuracy of the shape of the casing (positional accuracy of the ground terminal part relative to the fitting part, positional accuracy of the ground terminal part relative to the case part, or the like) is more reliably determined. Further, a reduction in the number of components or a reduction in the number of steps required for assembly can be achieved.

Further, in the connector according to one aspect of the present invention, the fitting part has a cylindrical shape extending along a second direction, the ground terminal part has a cylindrical shape extending along a first direction, and the second direction and the second direction are parallel to each other.

According to the connector of the present aspect, since the fitting part has a cylindrical shape extending along the second direction, the ground terminal part has a cylindrical shape extending along the first direction, and the first direction and the second direction are parallel to each other, the insertion direction of a cable to the fitting part and the insertion direction of the ground terminal part to the substrate-side connector can be matched.

Further, in the connector according to one aspect of the present invention, the fitting part has a cylindrical shape extending along a second direction, the ground terminal part has a cylindrical shape extending along a first direction, and the first direction and the second direction intersect each other.

According to the connector of the present aspect, since the fitting part has a cylindrical shape extending along the second direction, the ground terminal part has a cylindrical shape extending along the first direction, and the first direction and the second direction intersect each other, the insertion direction of a cable to the fitting part and the insertion direction of the ground terminal part to the substrate-side connector can be made to intersect each other.

Further, in the connector according to one aspect of the present invention, the casing has an opening configured to be externally accessed at a position at which the first direction and the second direction intersect each other inside the casing and includes a cover member that closes the opening.

According to the connector of the present aspect, since the casing has the opening configured to be externally accessed at a position at which the first direction and the second direction intersect each other inside the casing and includes the cover member that closes the opening, the contact pin inserted from the fitting part along the second direction and the contact pin inserted from the ground terminal part along the first direction can be joined (for example, soldered) to each other inside the casing by operation via the opening.

Further, after the joining operation, by closing the opening by the cover member, it is possible to prevent a foreign material from entering the casing.

According to the present invention, improvement in strength, improvement in shape accuracy, a reduction in the number of components, and a reduction in the number of steps required for assembly can be achieved.

BRIEF DESCRIPTION OF THE SEVERAL VIEWS OF THE DRAWINGS

FIG. 14 is a sectional view taken along a cutting line XIV-XIV illustrated in FIG. 13.

DETAILED DESCRIPTION

First Embodiment

A connector according to the first embodiment of the present invention will be described below with reference to the drawings.

Figure 1:
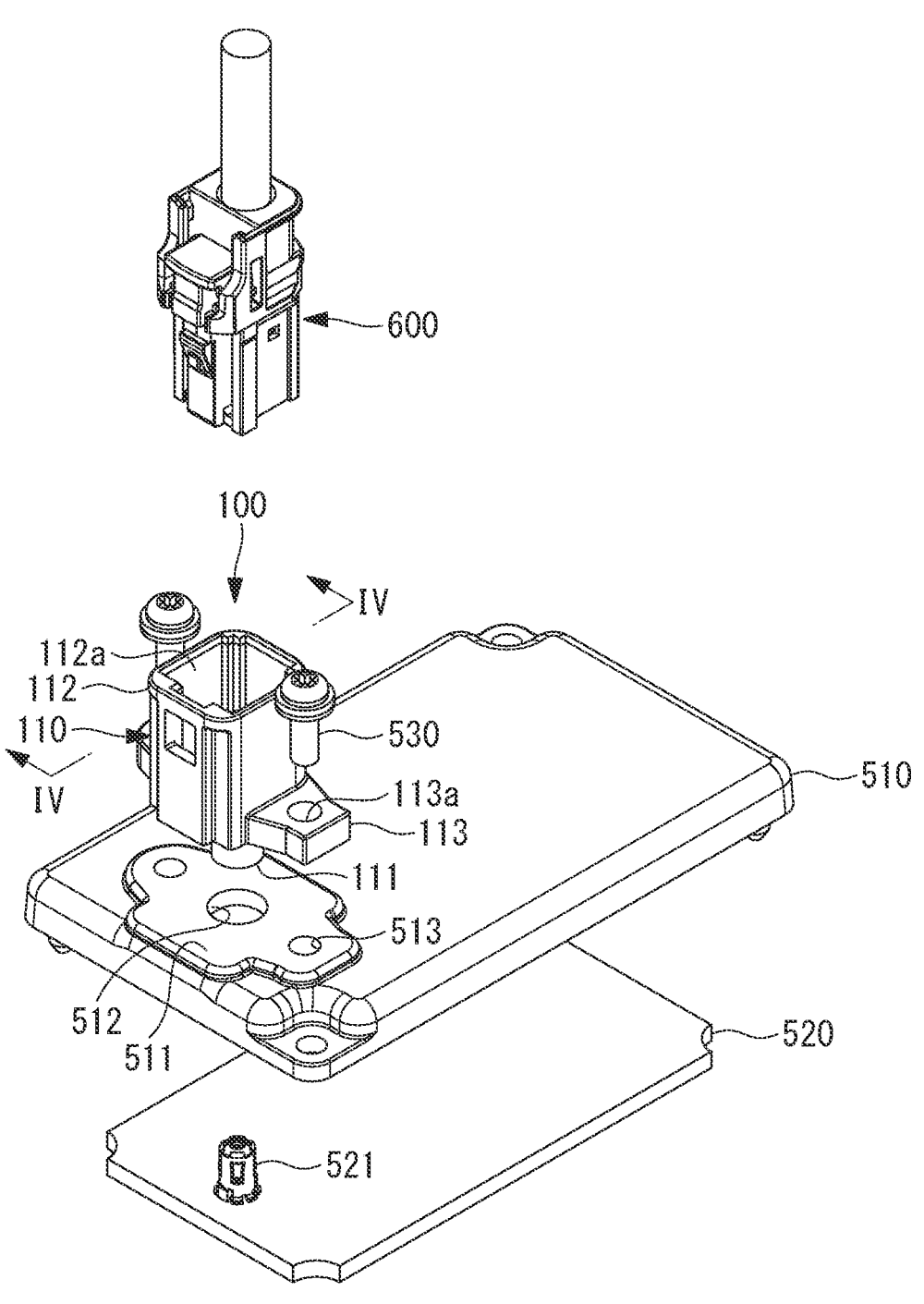
FIG. 1 is an exploded perspective view of a connector, a bottom camera case, and a substrate according to a first embodiment of the present invention.

As illustrated in FIG. 1, a connector 100 according to the present embodiment is a relay connector to connect a substrate-side connector 521 mounted on a substrate 520 included in an on-vehicle camera module and an outer cable 600 to each other, for example.

The substrate 520 is a substrate for driving an on-vehicle camera module, for example.

The outer cable 600 is a FAKRA specification coaxial connector, for example.

The substrate 520 is accommodated in a space defined by a camera case.

The camera case is formed of a bottom camera case 510 and a top camera case (not illustrated), for example.

An installation part 511 to which the connector 100 is attached is formed on the top face of the bottom camera case 510.

The installation part 511 is a portion where a part of the top face of the bottom camera case 510 swells, and the installation part 511 has a through hole 512 and a threaded hole 513.

The through hole 512 is a hole through which the outside of the bottom camera case 510 communicates with a space that accommodates the substrate 520. A ground terminal part 111 of the connector 100 described later is inserted in the through hole 512.

The threaded hole 513 is a hole where an internal thread is formed in the inner circumference face. A fixing thread 530 for fixing the connector 100 to the bottom camera case 510 is screwed into the threaded hole 513.

As illustrated in FIG. 1 to FIG. 4, the connector 100 includes a casing 110, an outer conductor 120, an insulator 130, and a contact pin 140.

The casing 110 is a metal component that accommodates the outer conductor 120, the insulator 130, and the contact pin 140, and these portions are integrally formed of a single member by die-cast, for example (aluminum die-cast or zinc die-cast, for example).

The casing 110 has the ground terminal part 111, a fitting part 112, and a flange part 113.

Figure 2:
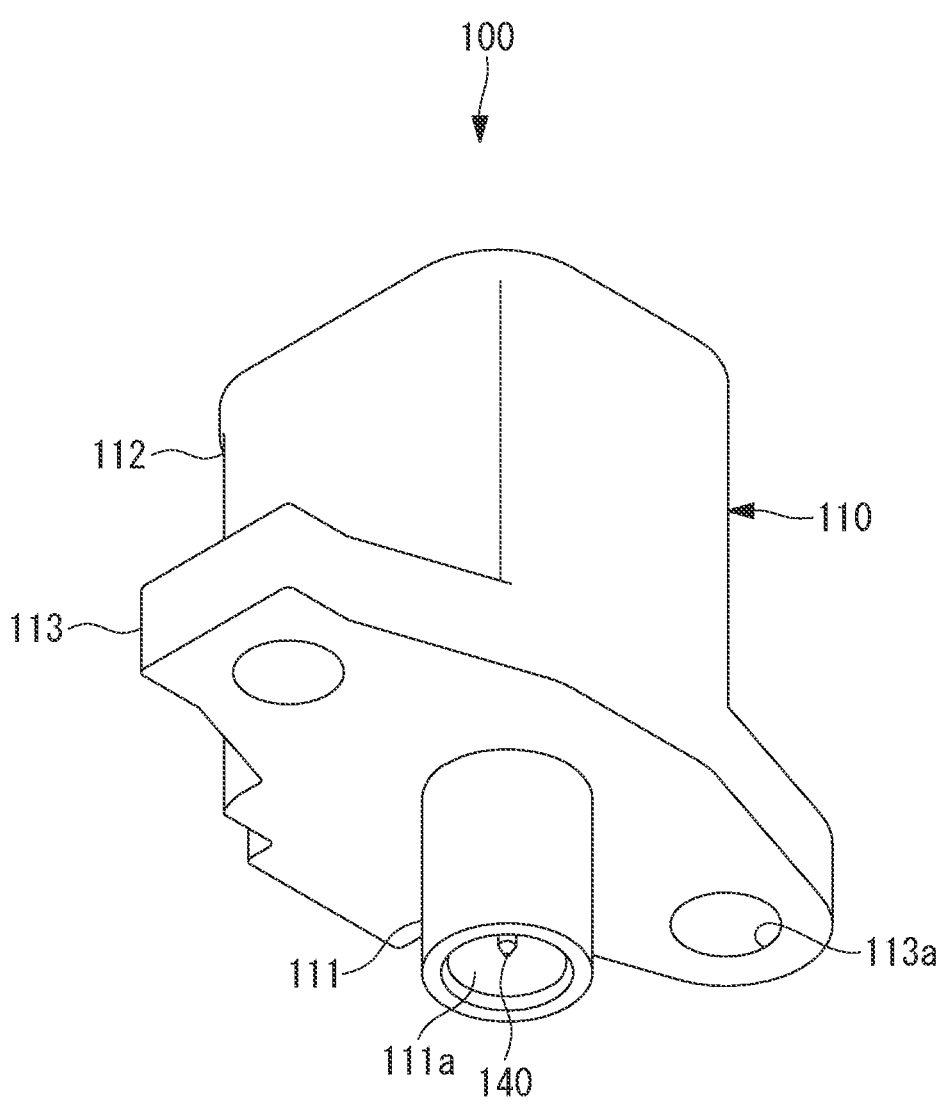
FIG. 2 is an underside perspective view of the connector according to the first embodiment of the present invention.
Figure 4:
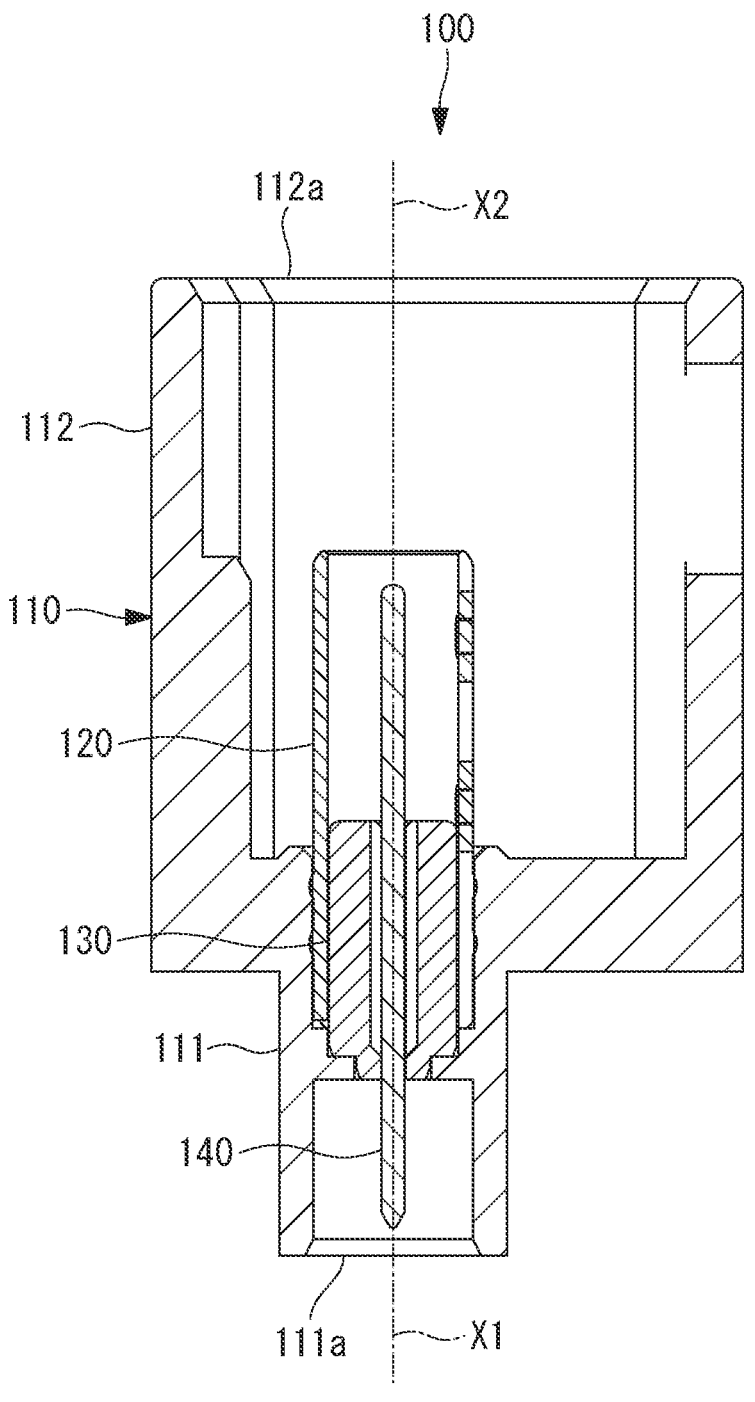
FIG. 4 is a sectional view taken along a cutting line IV-IV illustrated in FIG. 1.

As illustrated in FIG. 2 and FIG. 4, the ground terminal part 111 is a portion fitted into the outer circumference side of the substrate-side connector 521 and formed to a lower part of the casing 110.

The ground terminal part 111 has a cylindrical shape extending along the direction of an axis X1, and the lower end thereof is formed as an opening 111a and has a space inside. The substrate-side connector 521 is inserted from the opening 111a in the space. Accordingly, the ground terminal part 111 is electrically connected to the substrate-side connector 521.

Figure 3:
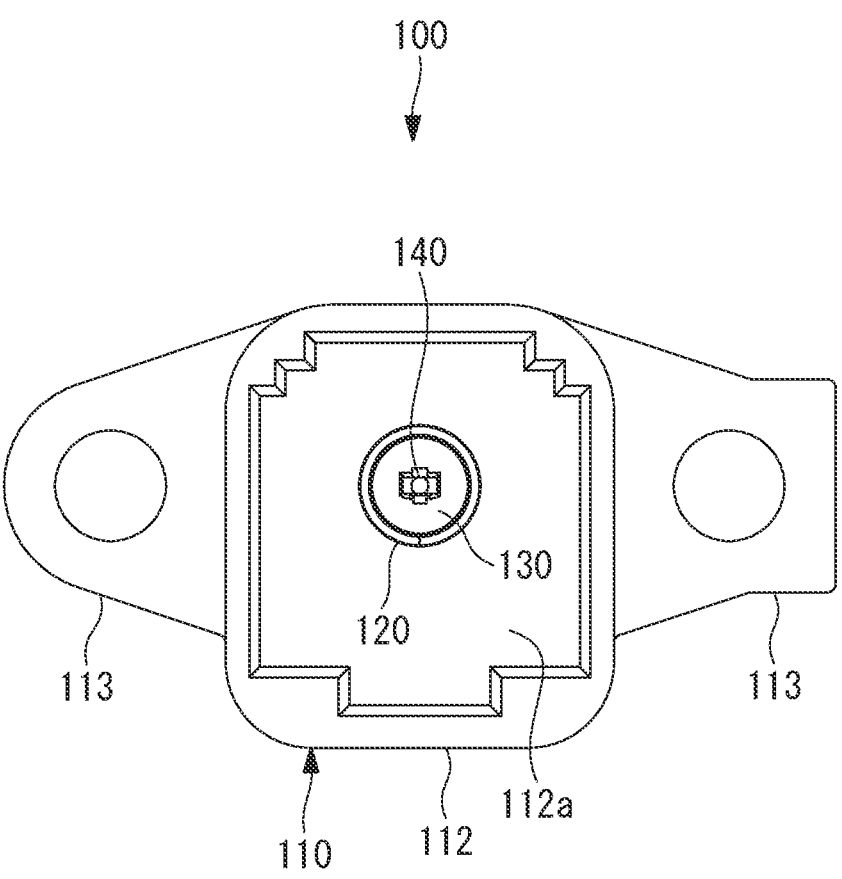
FIG. 3 is a plan view of the connector according to the first embodiment of the present invention.

As illustrated in FIG. 1, FIG. 3, and FIG. 4, the fitting part 112 is a portion where the outer circumference of the outer cable 600 is fitted inside, which is formed to an upper part of the casing 110.

The fitting part 112 has a cylindrical shape extending along the direction of an axis X2, and the upper end thereof is formed as an opening 112a and has a space inside. A connector portion of the outer cable 600 is inserted from the opening 112a in the space. The shape of the fitting part 112 corresponds to the shape of the connector portion of the inserted outer cable 600.

The connector 100 according to the present embodiment is a straight type in which the axis X1 of the ground terminal part 111 and the axis X2 of the fitting part 112 are parallel to each other.

As illustrated in FIG. 1 to FIG. 3, the flange part 113 is a portion formed so as to protrude from the facing side at the upper part of the ground terminal part 111. An insertion hole 113a through which a shaft part of the fixing thread 530 is inserted is formed in each flange part 113.

As illustrated in FIG. 3 and FIG. 4, the outer conductor 120 is a metal component having a cylindrical shape.

The outer conductor 120 is partially pressed into the casing 110 along the direction of the axis X2. Accordingly, the outer conductor 120 is fixed to the casing 110.

A portion of the outer conductor 120 which is not pressed into the casing 110 is located inside the fitting part 112, and the portion is connected to the outer cable 600 when the outer cable 600 has been inserted in the fitting part 112. Accordingly, the outer conductor 120 is electrically connected to the outer cable 600.

Note that the outer conductor 120 may be formed integrally with the fitting part 112 in the same manner as the ground terminal part 111. That is, the outer conductor 120 may be formed as a part of the casing 110.

As illustrated in FIG. 4, the insulator 130 is a component having a cylindrical shape and made of an insulating material.

The insulator 130 is pressed into the inside of the outer conductor 120 along the direction of the axis X2. Accordingly, the insulator 130 is fixed to the outer conductor 120.

The contact pin 140 is a metal component having a long, thin linear shape.

The contact pin 140 is inserted at the center of the insulator 130 along the axis X2. Accordingly, the contact pin 140 is fixed to the insulator 130. In this state, due to the insulation property of the insulator 130, the outer conductor 120 and the contact pin 140 are insulated from each other.

Both ends of the contact pin 140 protrude from both end faces of the insulator 130, respectively.

One end (upper end in FIG. 4) of the contact pin 140 protruding from the upper end face of the insulator 130 is located inside the outer conductor 120 and, when the outer cable 600 has been inserted in the fitting part 112, is connected to the outer cable 600. Accordingly, the contact pin 140 is electrically connected to the outer cable 600.

The other end (lower end in FIG. 4) of the contact pin 140 extruding from the lower end face of the insulator 130 is located inside the ground terminal part 111 and, when the substrate-side connector 521 has been inserted in the ground terminal part 111, is connected to the substrate-side connector 521. Accordingly, the contact pin 140 is electrically connected to the substrate-side connector 521.

Figure 5:
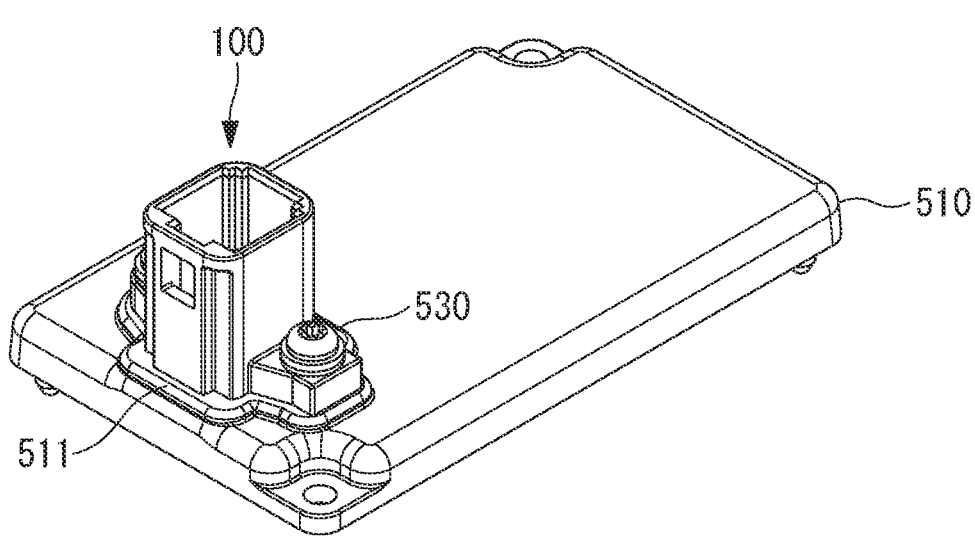
FIG. 5 is an assembly perspective view of the connector and the bottom camera case according to the first embodiment of the present invention.

As illustrated in FIG. 5, the connector 100 formed as described above is fastened to the installation part 511 of the bottom camera case 510 via the fixing thread 530 and thereby integrated with the bottom camera case 510. In this state, the ground terminal part 111 of the connector 100 and the contact pin 140 are electrically connected to the substrate-side connector 521 mounted to the substrate 520.

According to the present embodiment, the following advantageous effects are achieved.

Since the ground terminal part 111 and the fitting part 112 are integrally formed, the strength as the connector 100 can be improved compared to a case where the ground terminal part is joined (for example, welded) to the casing having a fitting part.

Accordingly, when the ground terminal part 111 of the connector 100 is connected to (fitted into) the substrate-side connector 521, the possibility of damage to the connector 100 can be reduced.

Further, since the ground terminal part 111 and the fitting part 112 are integrally formed, no gap between the ground terminal part 111 and the fitting part 112 is formed and the ground is enhanced compared to a case where the ground terminal part is joined to the casing having a fitting part, and therefore, electric performance is improved (signal transmission is stabilized). Furthermore, the shape accuracy of the casing 110 (such as positional accuracy of the ground terminal part 111 relative to the fitting part 112) is more reliably determined. Further, a reduction in the number of components or a reduction in the number of steps required for assembly can be achieved.

Second Embodiment

A connector according to the second embodiment of the present invention will be described below with reference to the drawings.

Note that the present embodiment differs from the first embodiment in the form of a casing but is common to the first embodiment in other features. Thus, detailed description of the common features will be omitted, and only the representation with references in the 200s having the same last two digits will be provided.

Figure 6:
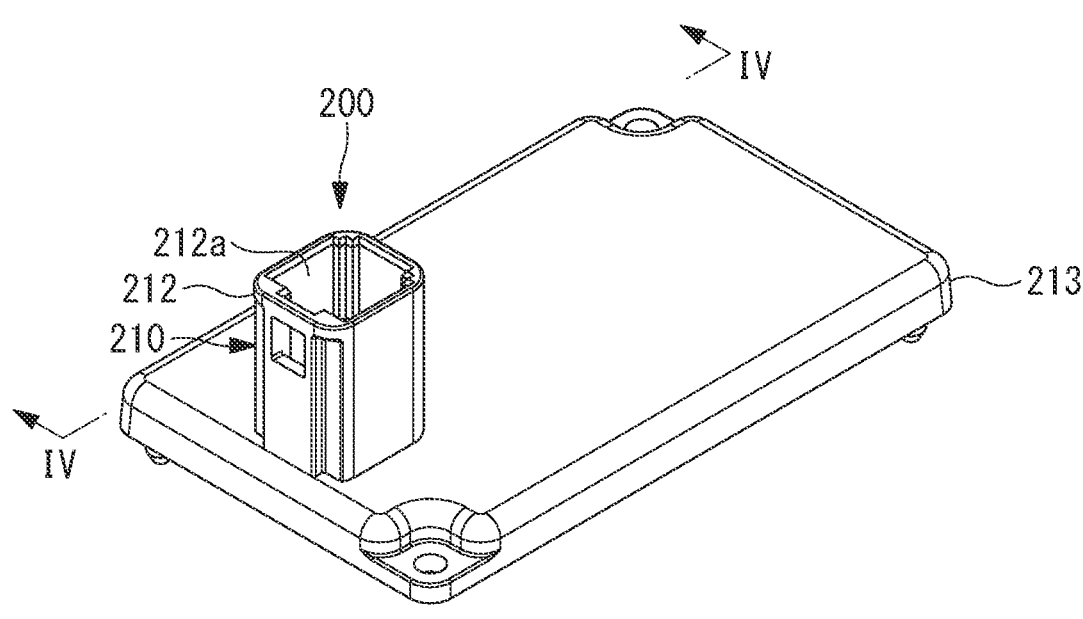
FIG. 6 is an upper perspective view of a connector according to a second embodiment of the present invention.
Figure 7:
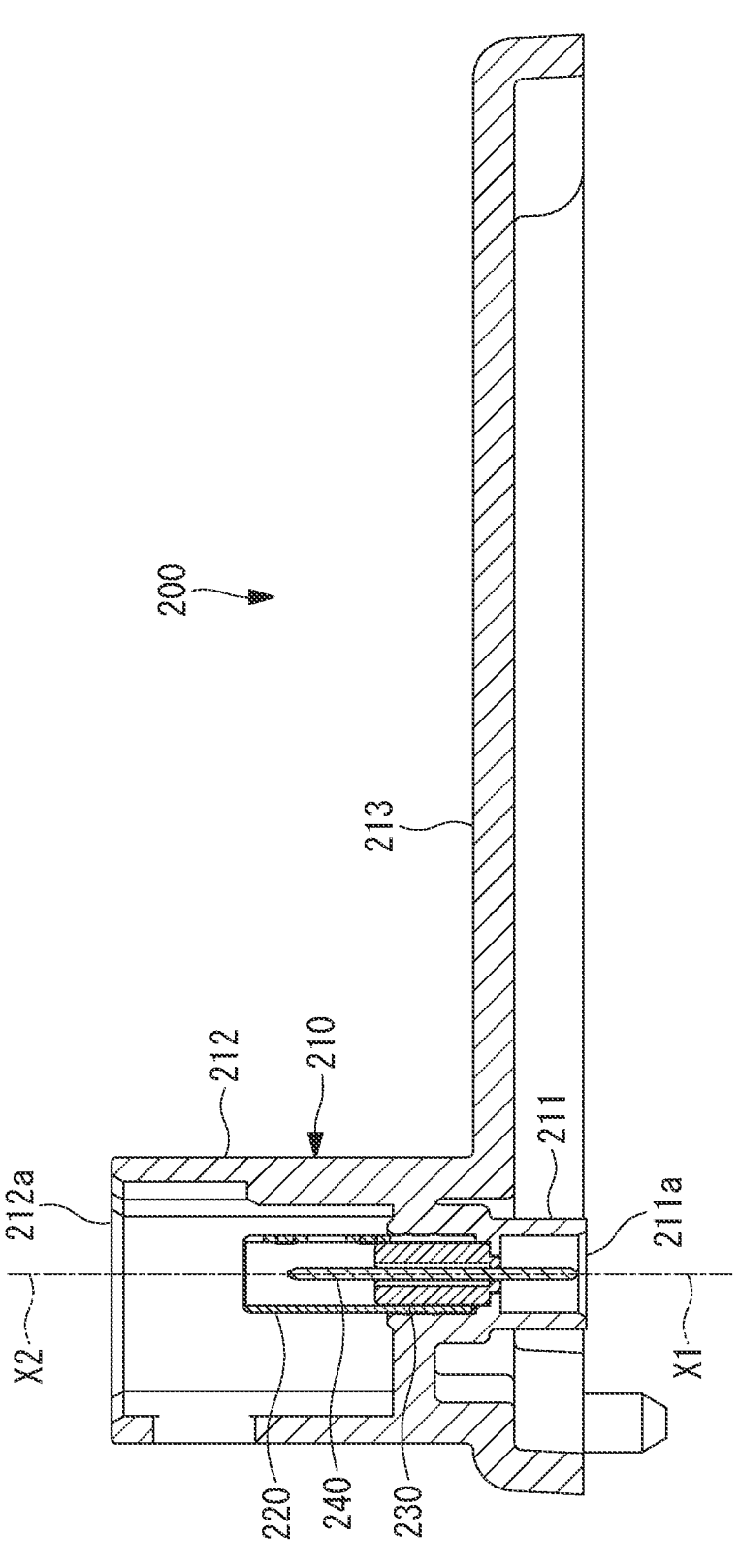
FIG. 7 is a sectional view taken along a cutting line VI-VI illustrated in FIG. 6.

As illustrated in FIG. 6 and FIG. 7, a connector 200 is formed integrally with the bottom camera case 510.

Specifically, a casing 210 of the connector 200 has a case part 213 corresponding to the bottom camera case 510. That is, together with a ground terminal part 211 and a fitting part 212, the case part 213 is formed of a single component as a part of the casing 210.

According to the present embodiment, the following advantageous effects are achieved.

Since the ground terminal part 211, the fitting part 212, and the case part 213 are integrally formed, the shape accuracy of a casing (positional accuracy of the ground terminal part 211 relative to the fitting part 212, positional accuracy of the ground terminal part 211 relative to the case part 213, or the like) is more reliably determined. Further, a reduction in the number of components or a reduction in the number of steps required for assembly can be achieved.

Third Embodiment

A connector according to the third embodiment of the present invention will be described below with reference to the drawings.

Note that the present embodiment differs from the first embodiment in the form of a casing but is common to the first embodiment in other features. Thus, detailed description of the common features will be omitted, and only the representation with references in the 300s having the same last two digits will be provided.

Figure 8:
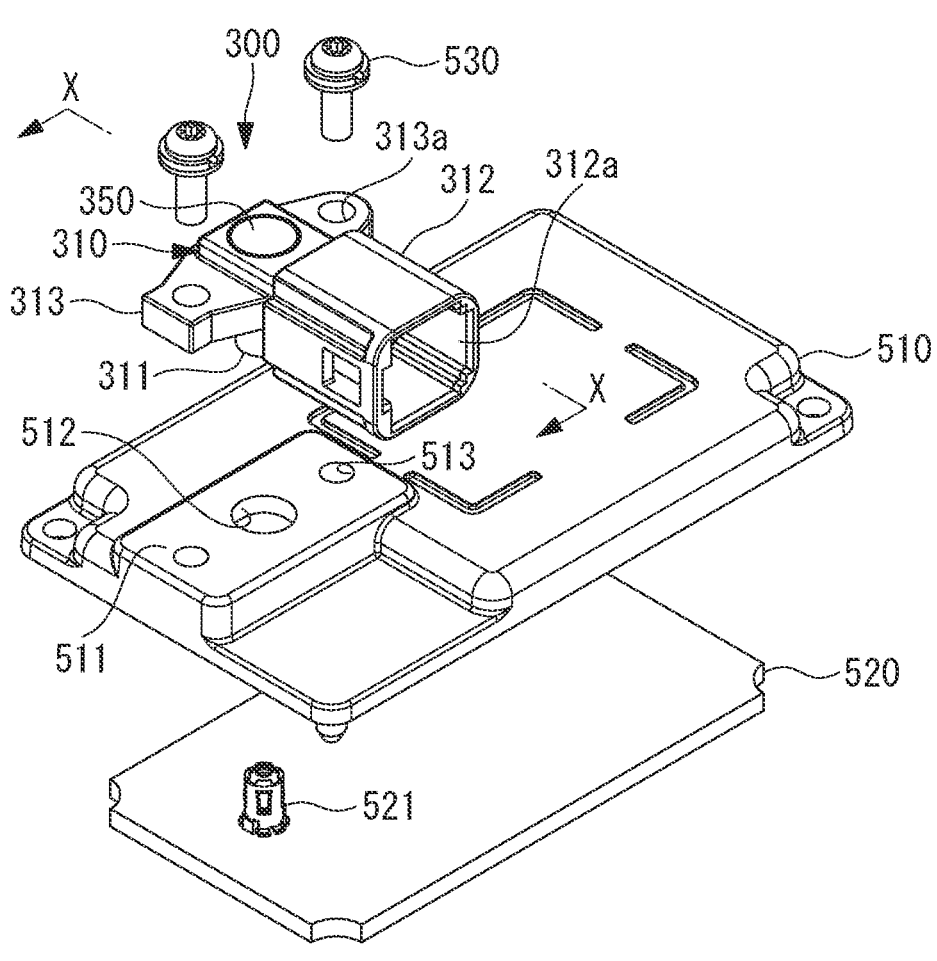
FIG. 8 is an exploded perspective view of a connector, a bottom camera case, and a substrate according to a third embodiment of the present invention.
Figure 9:
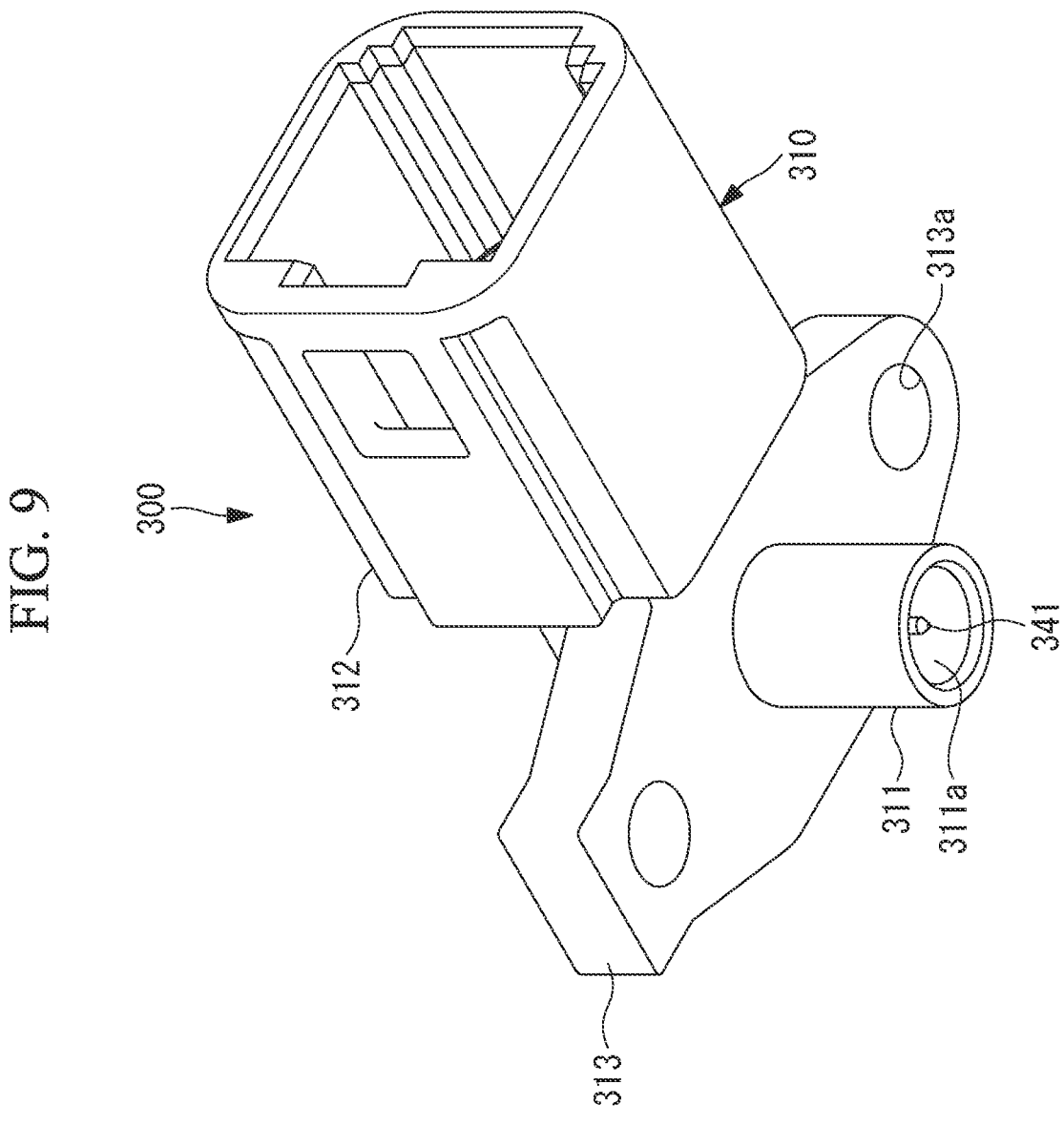
FIG. 9 is an underside perspective view of the connector according to the third embodiment of the present invention.
Figure 10:
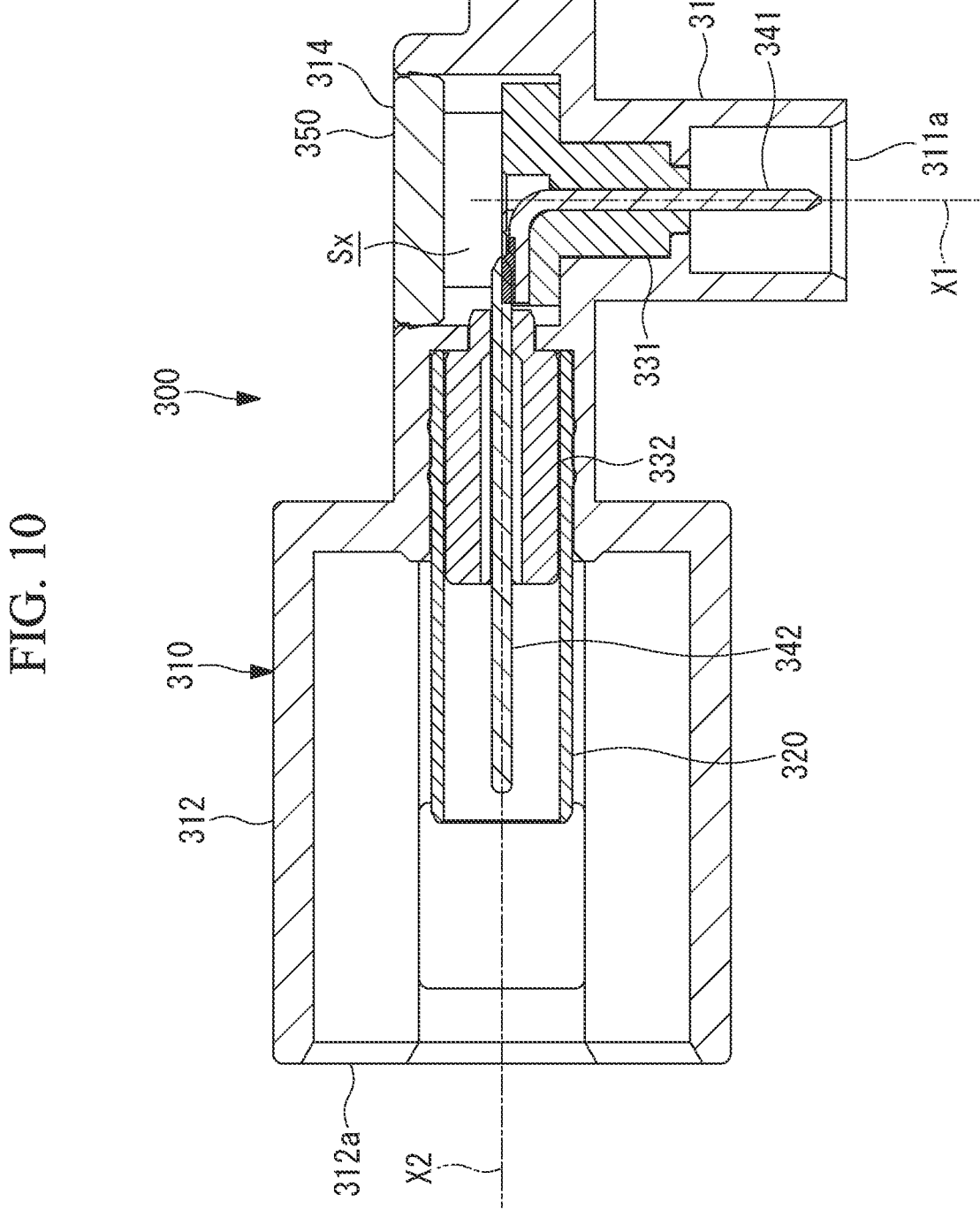
FIG. 10 is a sectional view taken along a cutting line X-X illustrated in FIG. 8.

As illustrated in FIG. 8 to FIG. 10, a connector 300 includes a casing 310, an outer conductor 320, a first insulator 331, a second insulator 332, a first contact pin 341, a second contact pin 342, and a cover member 350.

The casing 310 is a metal component that accommodates the outer conductor 320, the first insulator 331, the second insulator 332, the first contact pin 341, and the second contact pin 342, and these portions are integrally formed of a single member by die-cast, for example (aluminum die-cast or zinc die-cast, for example).

The casing 310 has a ground terminal part 311, a fitting part 312, and a flange part 313.

As illustrated in FIG. 9 and FIG. 10, the ground terminal part 311 is a portion fitted into the outer circumference side of the substrate-side connector 521.

The ground terminal part 311 has a cylindrical shape extending along the direction of the axis X1, and the lower end thereof is formed as an opening 311a and has a space inside. A substrate-side connector 521 is inserted from the opening 311a in the space. Accordingly, the ground terminal part 311 is electrically connected to the substrate-side connector 521.

As illustrated in FIG. 8 to FIG. 10, the fitting part 312 is a portion into which the outer cable 600 is internally fitted.

The fitting part 312 has a cylindrical shape extending along the direction of the axis X2, and one end thereof is formed as an opening 312a and defines a space inside. A connector portion of the outer cable 600 is inserted from the opening 312a in the space. The shape of the fitting part 312 corresponds to the shape of the connector portion of the inserted outer cable 600.

The connector 300 according to the present embodiment is an angle type where the axis X1 of the ground terminal part 311 and the axis X2 of the fitting part 312 intersect each other (for example, are orthogonal to each other).

Specifically, in the case of FIG. 10, the axis X1 of the ground terminal part 311 extends in the vertical direction, and the axis X2 of the fitting part 312 extends in the horizontal direction. Further, a base end (an end opposite to the opening 311a) of the ground terminal part 311 and a base end (an end opposite to the opening 312a) of the fitting part 312 are connected to each other.

Figure 11:
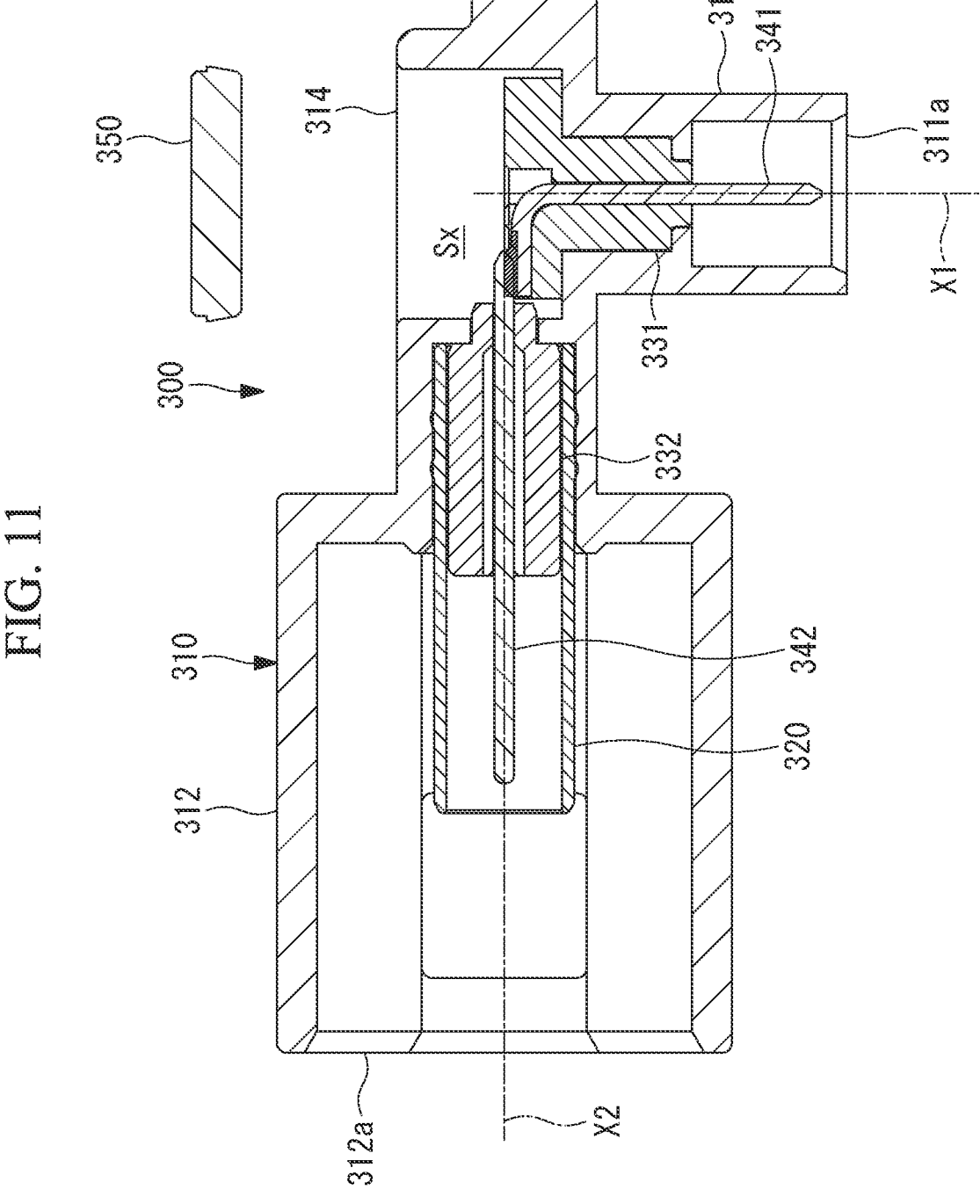
FIG. 11 is a sectional view illustrating a state where a cover member has been removed from a casing in the connector illustrating in FIG. 10.

As illustrated in FIG. 11, the casing 310 has an opening 314 that communicates with a portion where the axis X1 of the ground terminal part 311 and the axis X2 of the fitting part 312 intersect each other and a space Sx inside the casing 310 near the portion. This enables access to the space Sx via the opening 314 from outside of the casing 310.

As illustrated in FIG. 10 and FIG. 11, the cover member 350 corresponding to the shape of the opening 314 and made of a metal (made of stainless steel, for example) is fitted into the opening 314.

As illustrated in FIG. 8 and FIG. 9, the flange part 313 is a portion formed so as to protrude from the facing side at the upper part of the ground terminal part 311. An insertion hole 313a through which a shaft part of the fixing thread 530 is inserted is formed in each flange part 313.

As illustrated in FIG. 9 and FIG. 10, the outer conductor 320 is a metal component having a cylindrical shape.

The outer conductor 320 is partially pressed into the casing 310 along the direction of the axis X2. Accordingly, the outer conductor 320 is fixed to the casing 310.

A portion of the outer conductor 320 which is not pressed into the casing 310 is located inside the fitting part 312, and the portion is connected to the outer cable 600 when the outer cable 600 has been inserted in the fitting part 312. Accordingly, the outer conductor 320 is electrically connected to the outer cable 600.

Note that the outer conductor 320 may be formed integrally with the fitting part 312 in the same manner as the ground terminal part 311. That is, the outer conductor 320 may be formed as a part of the casing 310.

As illustrated in FIG. 10, the first insulator 331 is a component having a cylindrical shape and made of an insulating material having expanded diameter at the upper part.

The first insulator 331 is pressed into the inside of the ground terminal part 311 along the direction of the axis X1. Accordingly, the first insulator 331 is fixed to the ground terminal part 311.

Note that the first insulator 331 is inserted from the opening 314 (see FIG. 11).

The second insulator 332 is a component having a cylindrical shape and made of an insulating material.

The second insulator 332 is pressed into the inside of the outer conductor 320 along the direction of the axis X2. Accordingly, the second insulator 332 is fixed to the outer conductor 320.

The first contact pin 341 is a long, thin metal component having substantially an L-shape having a portion along the direction of the axis X1 and a portion along the direction of the axis X2.

In the first contact pin 341, the portion along the direction of the axis X2 has a shape bent toward the portion along the direction of the axis X1.

The portion along the direction of the axis X1 of the first contact pin 341 is inserted in the center of the first insulator 331 along the direction of the axis X1. Accordingly, the first contact pin 341 is fixed to the first insulator 331. In this state, due to the insulation property of the first insulator 331, the ground terminal part 311 and the first contact pin 341 are insulated from each other.

The portion (bent portion) along the direction of the axis X2 of the first contact pin 341 protrudes from the upper end face of the first insulator 331 and is located in the space Sx.

The end of the portion along the direction of the axis X1 of the first contact pin 341 protrudes from the lower end face of the first insulator 331.

The end of the first contact pin 341 protruding from the lower end face of the first insulator 331 is located inside the ground terminal part 311 and, when the substrate-side connector 521 has been inserted in the ground terminal part 311, is connected to the substrate-side connector 521. Accordingly, the first contact pin 341 is electrically connected to the substrate-side connector 521.

The second contact pin 342 is a metal component having a long, thin linear shape.

The second contact pin 342 is inserted in the center of the second insulator 332 along the direction of the axis X2. Accordingly, the second contact pin 342 is fixed to the second insulator 332. In this state, due to the insulation property of the second insulator 332, the outer conductor 320 and the second contact pin 342 are insulated from each other.

Both ends of the second contact pin 342 protrude from both end faces of the second insulator 332, respectively.

One end (left end in FIG. 10) of the second contact pin 342 extruding from the left end face of the second insulator 332 is located inside the outer conductor 320 and, when the outer cable 600 has been inserted in the fitting part 312, is connected to the outer cable 600. Accordingly, the second contact pin 342 is electrically connected to the outer cable 600.

The other end (right end in FIG. 10) of the contact pin 140 protruding from the right end face of the second insulator 432 is located in the space Sx.

The first contact pin 341 and the second contact pin 342 are connected to each other in the space Sx inside the casing 310.

Specifically, an end located in the space Sx of the first contact pin 341 and an end located in the space Sx of the second contact pin 342 are connected to each other by soldering. Accordingly, the first contact pin 341 and the second contact pin 342 are integrated and thereby function as one terminal.

Note that soldering is performed in the space Sx via the opening 314 (see FIG. 11). Further, after soldering is completed, the cover member 350 is fitted into the opening 314 to close the opening 314.

Figure 12:
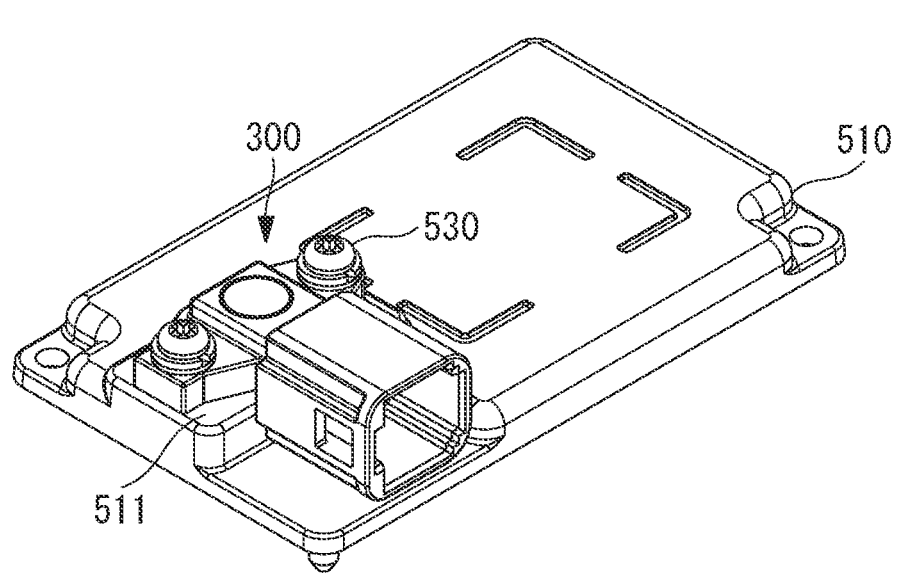
FIG. 12 is an assembly perspective view of the connector and the bottom camera case according to the third embodiment of the present invention.

As illustrated in FIG. 12, the connector 300 formed as described above is fastened to the installation part 511 of the bottom camera case 510 via the fixing thread 530 and thereby integrated with the bottom camera case 510. In this state, the ground terminal part 311 of the connector 300 and the first contact pin 341 are electrically connected to the substrate-side connector 521 mounted to the substrate 520.

According to the present embodiment, the following advantageous effects are achieved.

Since the direction of the axis X1 and the direction of the axis X2 intersect each other, the insertion direction of the outer cable 600 to the fitting part 312 and the insertion direction of the ground terminal part 311 to the substrate-side connector 521 can be made to intersect each other. Accordingly, the dimension in the height direction can be reduced.

Fourth Embodiment

A connector according to the fourth embodiment of the present invention will be described below with reference to the drawings.

Note that the present embodiment differs from the third embodiment in the form of a casing but is common to the third embodiment in other features. Thus, detailed description of the common features will be omitted, and only the representation with reference in the 400s having the same last two digits will be provided.

Figure 13:
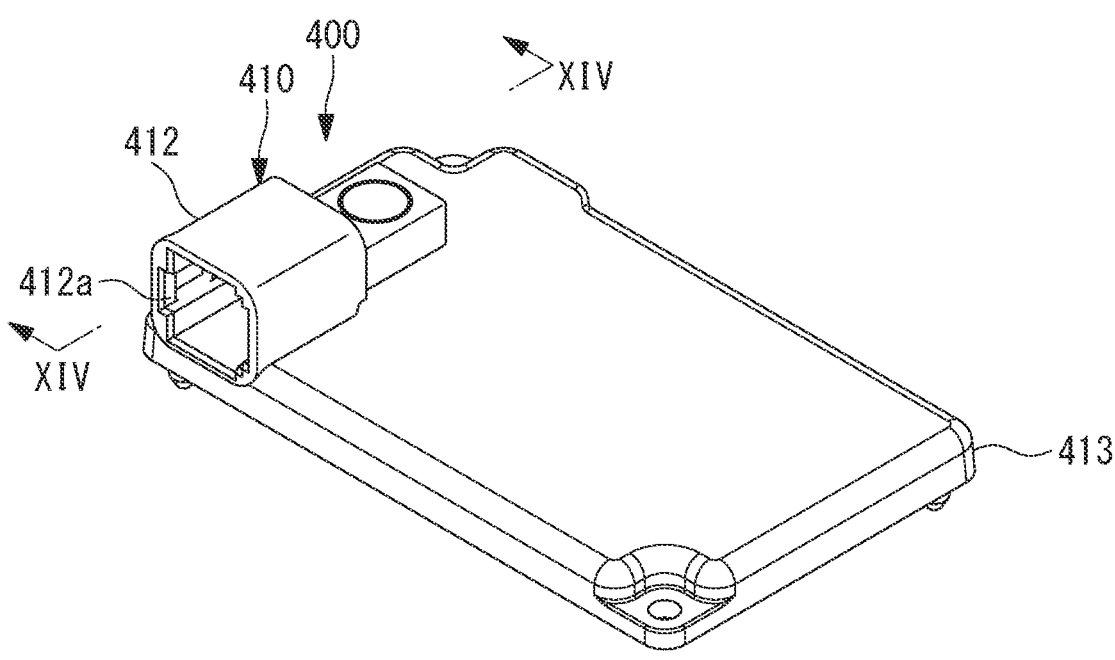
FIG. 13 is an upper perspective view of a connector according to a fourth embodiment of the present invention.
Figure 14:
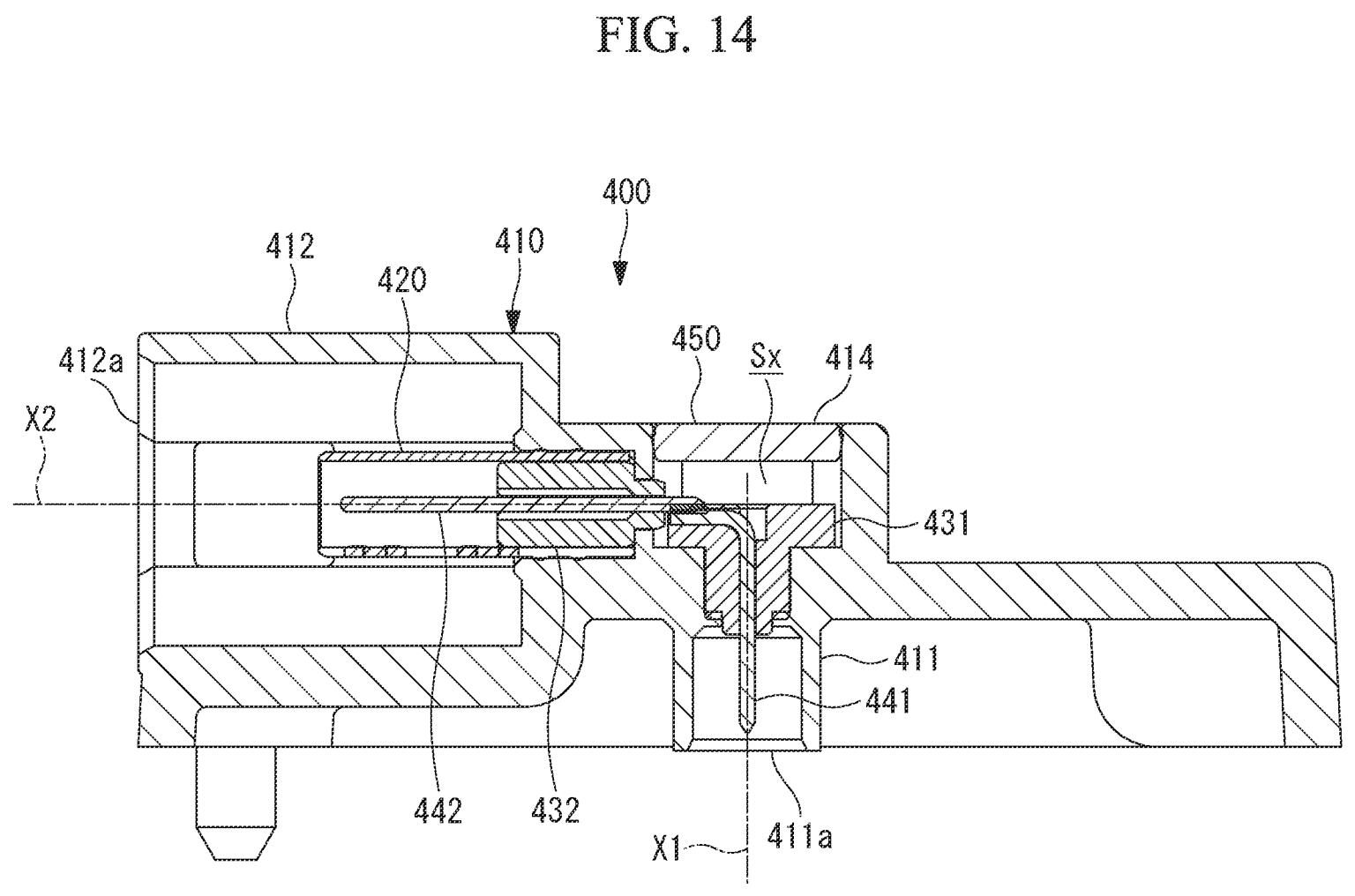

As illustrated in FIG. 13 and FIG. 14, a connector 400 is formed integrally with the bottom camera case 510.

Specifically, a casing 410 of the connector 400 has a case part 413 corresponding to the bottom camera case 510. That is, together with a ground terminal part 411 and a fitting part 412, the case part 413 is formed of a single component as a part of the casing 410.

According to the present embodiment, the following advantageous effects are achieved.

Since the ground terminal part 411, the fitting part 412, and the case part 413 are integrally formed, the shape accuracy of a casing (positional accuracy of the ground terminal part 411 relative to the fitting part 412, positional accuracy of the ground terminal part 411 relative to the case part 413, or the like) is more reliably determined. Further, a reduction in the number of components or a reduction in the number of steps required for assembly can be achieved.

Note that the terms "upper/top". "lower/under", "left", and "right" used in the description of each embodiment are used for the purpose of illustration and do not limit the position (attitude) in actual use.

LIST OF REFERENCE SYMBOLS 100 connector
110 casing
111 ground terminal part
111a opening
112 fitting part
112a opening
113 flange part
113a insertion hole
120 outer conductor
130 insulator
140 contact pin
200 connector
210 casing
211 ground terminal part
211a opening
212 fitting part
212a opening
213 case part
220 outer conductor
230 insulator
240 contact pin
300 connector
310 casing
311 ground terminal part
311a opening
312 fitting part
312a opening
313 flange part
314 opening
320 outer conductor
331 first insulator
332 second insulator
341 first contact pin
342 second contact pin
350 cover member
400 connector
410 casing
411 ground terminal part
411a opening
412 fitting part
412a opening
413 case part
414 opening
420 outer conductor
431 first insulator
432 second insulator
441 first contact pin
442 second contact pin
450 cover member
510 camera bottom case
511 installation part
512 through hole
513 threaded hole
520 substrate
521 substrate-side connector
530 fixing thread
600 outer cable

What is claimed is:

1. A connector for connecting an external substrate and an external cable to each other, the connector comprising:
a metal casing having a ground terminal part and a fitting part configured to accept the external cable, the ground terminal part being configured to electrically connect to an external substrate-side connector mounted to the external substrate, and the ground terminal part being configured so that the external substrate-side connector fits into the ground terminal part directly, wherein the ground terminal part and the fitting part are integrally formed as one member;
a contact pin, the contact pin being configured to be connected to the external cable and the external substrate-side connector; and
an outer conductor accommodating the contact pin therein, the outer conductor being located inside the fitting part,
wherein the ground terminal part has a cylindrical shape extending along a first direction,
wherein the fitting part has a cylindrical shape extending along a second direction,
wherein the contact pin has a first portion and a second portion, the first portion being located inside the ground terminal part and extending along the first direction, the second portion being located inside the fitting part and extending along the second direction, and
wherein the first direction and the second direction intersect each other.

2. The connector according to claim 1, wherein the casing has a case part that accommodates the substrate, and the ground terminal part, the fitting part, and the case part are integrally formed as one member.

3. The connector according to claim 1, wherein the casing has an opening configured to be externally accessed at a position at which the first direction and the second direction intersect each other inside the casing and comprises a cover member that closes the opening.

4. The connector according to claim 3, wherein the opening is formed at a position that intersects the first direction.

5. The connector according to claim 3, wherein the contact pin has a first contact pin and a second contact pin, the first contact pin including the first portion and a third portion extending along the second direction, the second contact pin including the second portion and being connected to the third portion of the first contact pin, wherein the opening is formed above a connection portion where the first contact pin and the second contact pin are connected to each other.

* * * * *